US010178861B2

(12) United States Patent
Leier et al.

(10) Patent No.: US 10,178,861 B2
(45) Date of Patent: Jan. 15, 2019

(54) FLY CATCHER

(71) Applicant: Expectations, LLC, Puyallup (TW)

(72) Inventors: Christopher Henry Leier, Taichung, WA (US); Lo Pin Wang, Taichung (TW)

(73) Assignee: Expectations, LLC, Puyallup, WA (US)

( * ) Notice: Subject to any disclaimer, the term of this patent is extended or adjusted under 35 U.S.C. 154(b) by 102 days.

(21) Appl. No.: 14/740,308

(22) Filed: Jun. 16, 2015

(65) Prior Publication Data

US 2016/0366870 A1 Dec. 22, 2016

(51) Int. Cl.
*A01M 1/10* (2006.01)
*A01M 1/02* (2006.01)

(52) U.S. Cl.
CPC ............... *A01M 1/106* (2013.01); *A01M 1/02* (2013.01); *Y02A 50/371* (2018.01)

(58) Field of Classification Search
CPC ................................ A01M 1/02; A01M 1/106
See application file for complete search history.

(56) References Cited

U.S. PATENT DOCUMENTS

| 1,139,717 | A | * | 5/1915 | Pipenhager | ..................... 43/121 |
| 1,297,894 | A | * | 3/1919 | Navrot | ............................. 43/122 |
| 1,666,785 | A | * | 4/1928 | March | ..................... A01M 1/02 43/122 |
| 1,700,517 | A | * | 1/1929 | Ross | .................... A01M 1/2005 43/121 |
| 1,772,729 | A | * | 8/1930 | Pisani | ..................... A01M 1/10 43/107 |
| 1,867,252 | A | * | 7/1932 | Crigler | ..................... A01M 1/02 43/121 |
| 2,770,066 | A | * | 11/1956 | O'Sullivan | ............. A01M 1/02 43/107 |
| 4,141,173 | A | | 2/1979 | Welmert et al. | |
| 4,217,723 | A | | 8/1980 | Hrebec | |
| 4,218,842 | A | * | 8/1980 | Anderson | ............... A01M 1/02 215/321 |
| 4,638,592 | A | * | 1/1987 | Schneidmiller | ......... A01M 1/02 426/1 |
| 4,930,251 | A | * | 6/1990 | Crisanti | .................. A01M 1/02 43/107 |
| 5,226,254 | A | * | 7/1993 | MacMenigall | ......... A01M 1/10 43/107 |
| 5,231,791 | A | * | 8/1993 | Falkson | .................. A01M 1/02 43/107 |

(Continued)

*Primary Examiner* — Michael H Wang
(74) *Attorney, Agent, or Firm* — Dicke, Billig & Czaja, PLLC

(57) ABSTRACT

A fly catcher includes a housing having an orifice formed in an upper peripheral portion and communicating with an inner chamber of the housing, and a cover includes a lower peripheral portion rotatably engaged with the upper peripheral portion of the housing, the cover includes an opening for selectively aligning with the orifice of the housing when the cover is rotated relative to the housing, and the cover includes a casing extended from an upper portion into the cover, and the casing includes an aperture for guiding a fly or mosquito into the cover and the housing. The cover includes a key slidably engaged with a channel of the housing for guiding and limiting the cover to rotate relative to the housing.

16 Claims, 6 Drawing Sheets

(56) References Cited

U.S. PATENT DOCUMENTS

| | | | | |
|---|---|---|---|---|
| 5,363,589 | A | 11/1994 | Flynn | |
| 5,461,822 | A | 10/1995 | Green et al. | |
| 6,112,452 | A * | 9/2000 | Campbell | A01M 1/02 |
| | | | | 215/319 |
| 6,532,695 | B1 * | 3/2003 | Alvarado | A01M 1/106 |
| | | | | 43/107 |
| 6,615,473 | B2 * | 9/2003 | McClean | B65D 43/169 |
| | | | | 215/321 |
| 6,637,149 | B1 * | 10/2003 | Bauer | A01M 1/02 |
| | | | | 43/107 |
| 6,860,062 | B2 * | 3/2005 | Spragins | A01M 1/026 |
| | | | | 43/107 |
| 7,644,834 | B2 * | 1/2010 | Castora | A61B 50/36 |
| | | | | 220/229 |
| 8,051,600 | B2 * | 11/2011 | Schneidmiller | A01M 1/106 |
| | | | | 43/122 |
| 8,448,376 | B2 * | 5/2013 | Kagawa | A01M 1/106 |
| | | | | 43/107 |
| 2008/0196296 | A1 * | 8/2008 | Studer | A01M 1/02 |
| | | | | 43/114 |

* cited by examiner

FLY CATCHER

BACKGROUND OF THE INVENTION

1. Field of the Invention

The present invention relates to a fly catcher, and more particularly to a fly catcher including an improved and simplified structure or configuration that may be easily and quickly made or manufactured by the workers with a simplified making or manufacturing procedure and with a decreased manufacturing cost.

2. Description of the Prior Art

Various kinds of typical fly catchers or mosquito lamps have been developed and provided for catching and removing flies and/or mosquitos, and normally comprise a housing for attracting and receiving the flies and/or the mosquitos, in which the typical mosquito lamps are required to be energized with electric power or energy. The other typical fly catchers have been developed and provided for catching and removing flies and/or mosquitos without electric power or energy.

For example, U.S. Pat. No. 4,141,173 to Welmert et al., U.S. Pat. No. 4,217,723 to Hrebec, U.S. Pat. No. 5,363,589 to Flynn, and U.S. Pat. No. 5,461,822 to Green et al. disclose several of the typical fly catchers each also comprising a housing for attracting and receiving the flies and/or the mosquitos.

However, the typical fly catchers includes a complicated structure or configuration that may not be easily and quickly made or manufactured by the workers, and that may include a complicated making or manufacturing procedure, and that may include a greatly increased manufacturing cost.

The present invention has arisen to mitigate and/or obviate the afore-described disadvantages of the conventional fly catchers or the like.

SUMMARY OF THE INVENTION

The primary objective of the present invention is to provide a fly catcher including an improved and simplified structure or configuration that may be easily and quickly made or manufactured by the workers with a simplified making or manufacturing procedure and with a decreased manufacturing cost.

In accordance with one aspect of the invention, there is provided a fly catcher comprising a housing including a base portion for engaging with a support surface, and including a chamber formed in the housing, and the housing including an upper peripheral portion, and including an orifice formed in the upper peripheral portion of the housing and communicating with the chamber of the housing, and a cover including a compartment formed therein, and including a lower peripheral portion engaged with the upper peripheral portion of the housing for guiding the cover to rotate relative to the housing, the cover including an opening formed therein for selectively aligning with the orifice of the housing when the cover is rotated relative to the housing, and the cover including a casing extended from an upper portion of the casing into the compartment of the cover, and the casing includes a space formed therein and spaced from the compartment of the cover by the casing, the casing includes an aperture formed therein and communicating with the space of the casing and communicating with the compartment of the cover for guiding a fly or mosquito into the cover and the housing and for preventing the fly or the mosquito from flying out of the casing and of the cover.

The housing includes a serrated pattern provided thereon, and/or the cover includes a serrated pattern provided thereon for attracting and confusing the flies and/or the mosquitos into the housing and the cover.

The housing includes a peripheral recess formed in the upper peripheral portion of the housing, and the cover includes a peripheral flange extended downwardly from the lower peripheral portion of the cover for slidably engaging with the peripheral recess of the housing and for guiding the cover to rotate relative to the housing.

The opening of the cover is formed in the peripheral flange of the cover. The housing includes a channel formed therein, and the cover includes a key extended from the peripheral flange for slidably engaging with the channel of the housing and for guiding and limiting the cover to rotate relative to the housing.

The housing includes at least one notch formed in the upper peripheral portion of the housing and communicating with the channel of the housing. The casing includes at least one slot formed in the casing and communicating with the compartment of the cover and communicating with the space of the casing also for guiding a fly or mosquito into the cover and the housing and for preventing the fly or the mosquito from flying out of the casing and of the cover.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
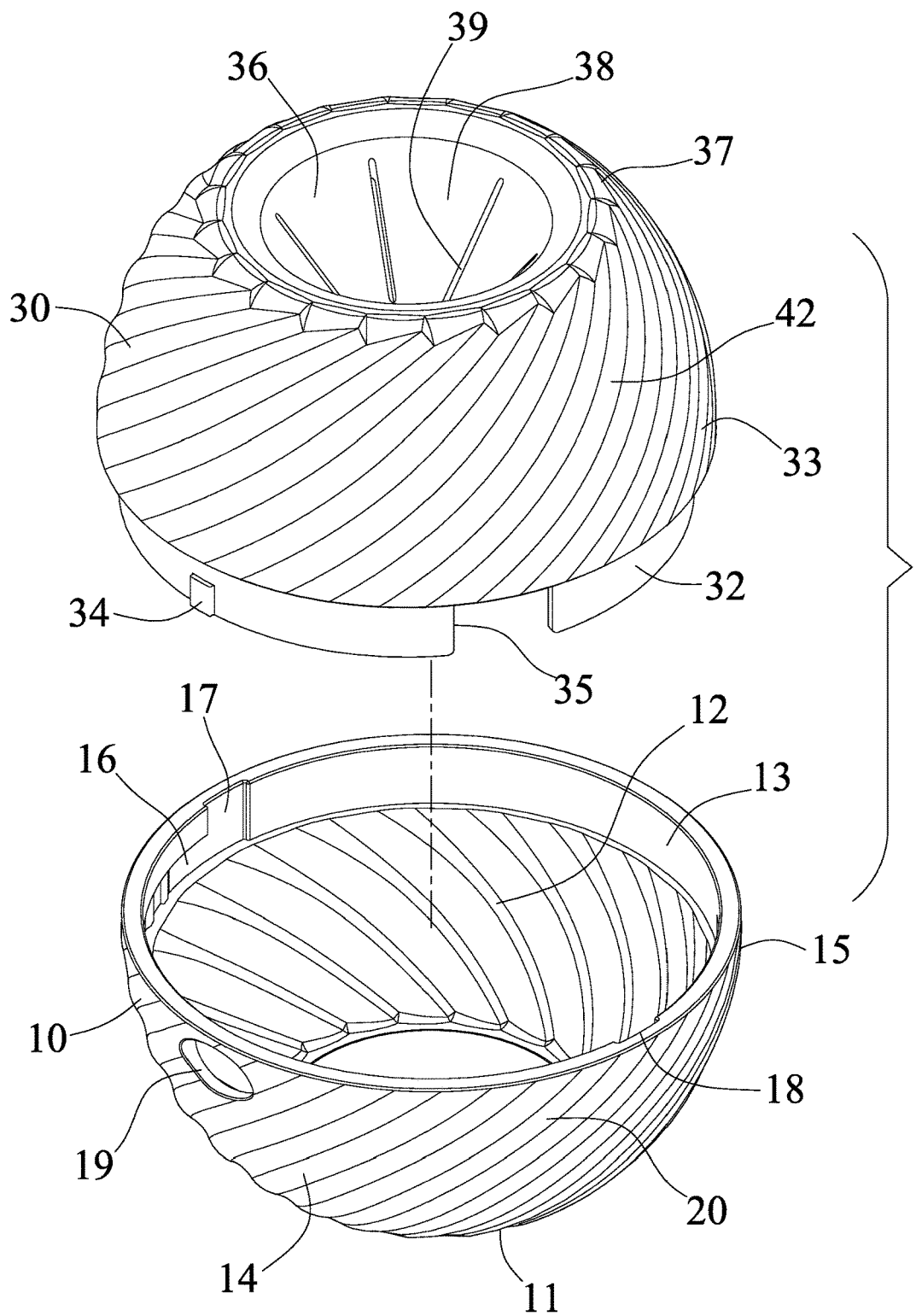
FIG. 1 is an exploded view of a fly catcher in accordance with the present invention.
Figure 2:
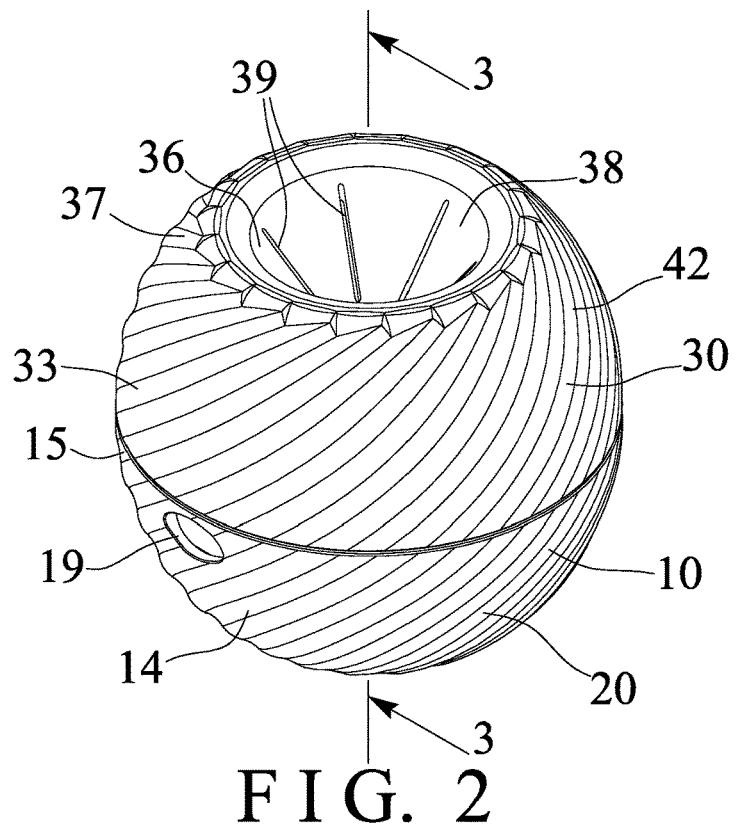
FIG. 2 is a perspective view of the fly catcher.
Figure 3:
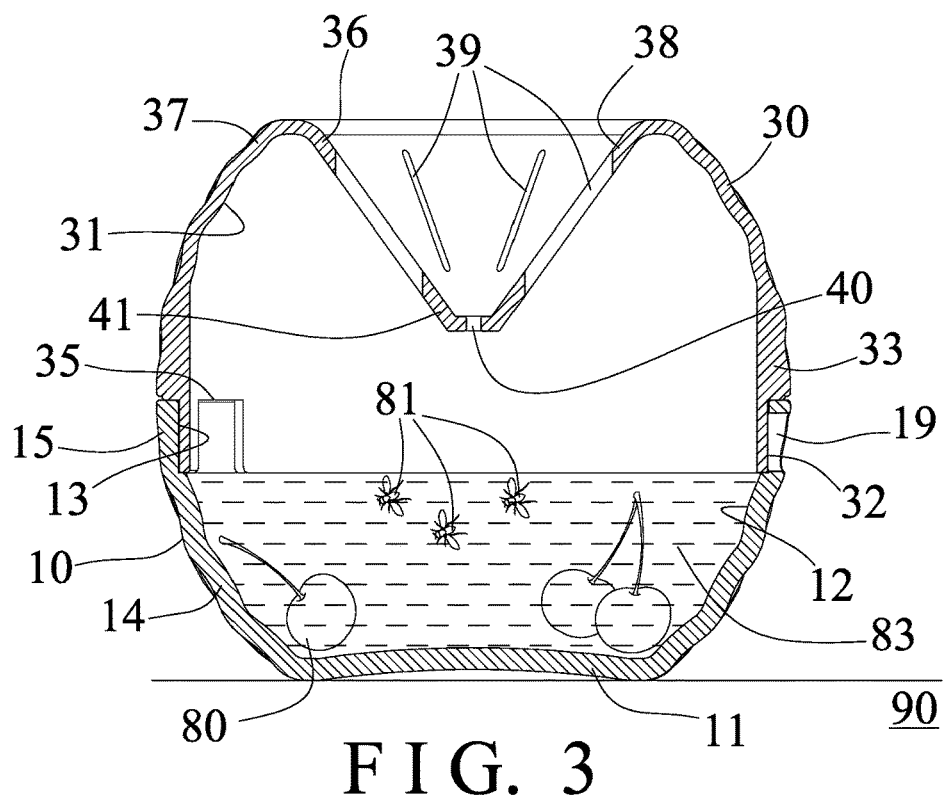
FIG. 3 is a cross sectional view of the fly catcher, taken along lines 3-3 of FIG. 2.

Referring to the drawings, and initially to FIGS. 1-3, a fly catcher in accordance with the present invention comprises an outer receptacle 1 including a lower or base housing 10 and an upper casing or cover 30 to be contacted or engaged with each other, for example, the housing 10 includes a lower or bottom or base portion 11 having a planar or slightly and upwardly curved structure or configuration (FIGS. 3-5) for allowing the housing 10 to be solidly and stably engaged with and supported on a support ground or surface 90 (FIG. 3). The housing 10 includes a simultaneously semi-spherical structure or configuration having a compartment or chamber 12 formed therein, and includes an inner peripheral shoulder or recess 13 formed or provided in the inner peripheral portion at the upper peripheral portion 15 of the peripheral wall 14 or of the housing 10, best shown in FIGS. 3-5.

The housing 10 includes a groove or channel 16 also formed or provided in the inner peripheral portion at the upper peripheral portion 15 of the housing 10 and communicating with the inner peripheral recess 13 and/or the chamber 12 of the housing 10, and the channel 16 of the housing 10 includes a limited length, such as one half of the upper peripheral portion 15 of the housing 10, and includes one or more (such as two) notches 17, 18 also formed or provided in the inner peripheral portion at the upper peripheral portion 15 of the housing 10 and communicating with the inner peripheral recess 13 of the housing 10 and also communicating with the channel 16 of the housing 10, and includes a circular-shaped orifice 19 formed or provided in the upper peripheral portion 15 of the housing 10 and communicating with the chamber 12 of the housing 10.

The cover 30 also includes a simultaneously semi-spherical structure or configuration having a chamber or compartment 31 formed therein, and includes a peripheral flange 32 extended downwardly from the lower peripheral portion 33 thereof for slidably engaging into or with the inner peripheral recess 13 of the housing 10 and for guiding the cover 30 to pivot or rotate relative to the housing 10 and for preventing the cover 30 from being disengaged or separated from the housing 10, and includes a projection or key 34 extended radially and outwardly from the peripheral flange 32 for selectively engaging into or with either of the notches 17, 18 of the housing 10 and for slidably engaging into the channel 16 of the housing 10 and thus for guiding and limiting the cover 30 to pivot or rotate relative to the housing 10 and for preventing the cover 30 from being disengaged or separated from the housing 10.

The cover 30 further includes a square or rectangular notch or opening 35 for selectively aligning with the orifice 19 of the housing 10 (FIGS. 4, 5) or for being selectively offset or spaced or disengaged or separated from the orifice 19 of the housing 10 (FIG. 3) by pivoting or rotating the cover 30 relative to the housing 10, for example, the opening 35 of the cover 30 may be selectively positioned to and aligned with the orifice 19 of the housing 10 (FIGS. 4, 5) when the key 34 is engaged with one end of the channel 16 of the housing 10. The cover 30 further includes a cone-shaped casing 36 extended from the upper portion 37 of the casing 30 into the compartment 31 of the cover 30, and the casing 36 includes a space 38 formed therein and offset or spaced or separated from the compartment 31 of the cover 30 by the cone-shaped casing 36.

The cover 30 further includes one or more slots 39 formed in the casing 36 and communicating with the compartment 31 of the cover 30 and also communicating with the space 38 of the casing 36, and further includes one or more apertures 40 formed in the lower or bottom portion 41 of the casing 36 and also communicating with the space 38 of the casing 36 and also communicating with the compartment 31 of the cover 30, and the slots 39 and/or the apertures 40 of the casing 36 and arranged for allowing the flies and/or the mosquitos to easily fly into the compartment 31 of the cover 30, but for preventing the flies and/or the mosquitos from flying out of the casing 36 and of the cover 30. As shown in FIGS. 1 and 2, the housing 10 may include a number of ribs or a spatial or serrated pattern 20 formed or provided thereon, and/or the cover 30 may also include a spatial or serrated pattern 42 formed or provided thereon for attracting and confusing the flies and/or the mosquitos 80.

Figure 4:
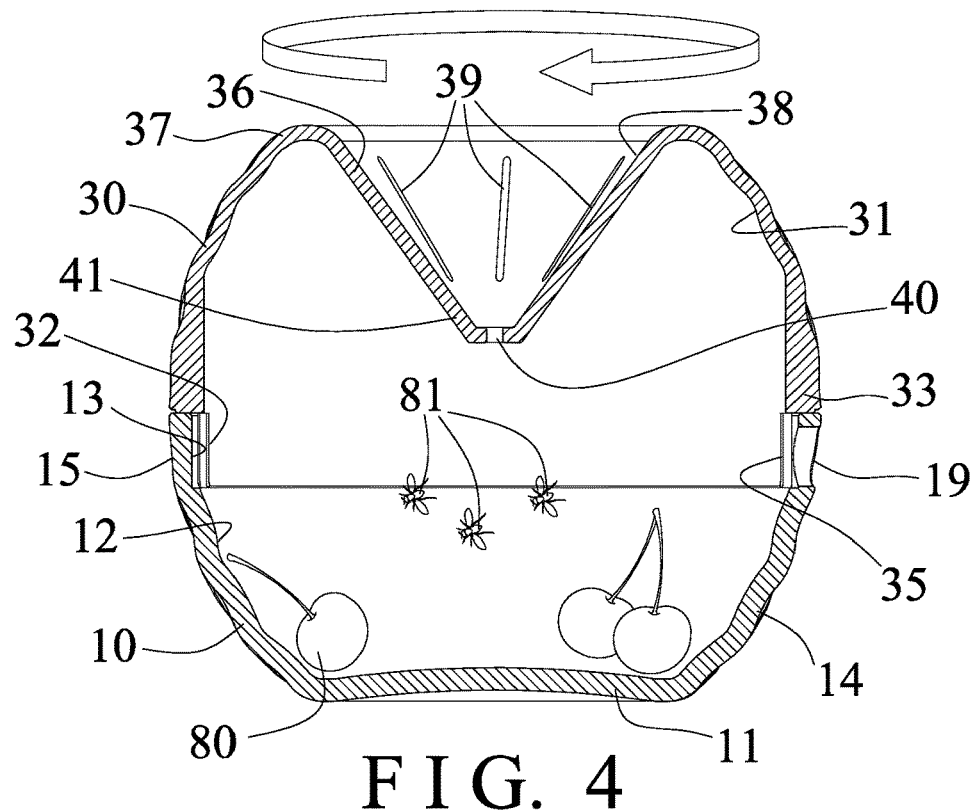
FIGS. 4, 5 are cross sectional views similar to FIG. 3, illustrating the operation of the fly catcher.
Figure 5:
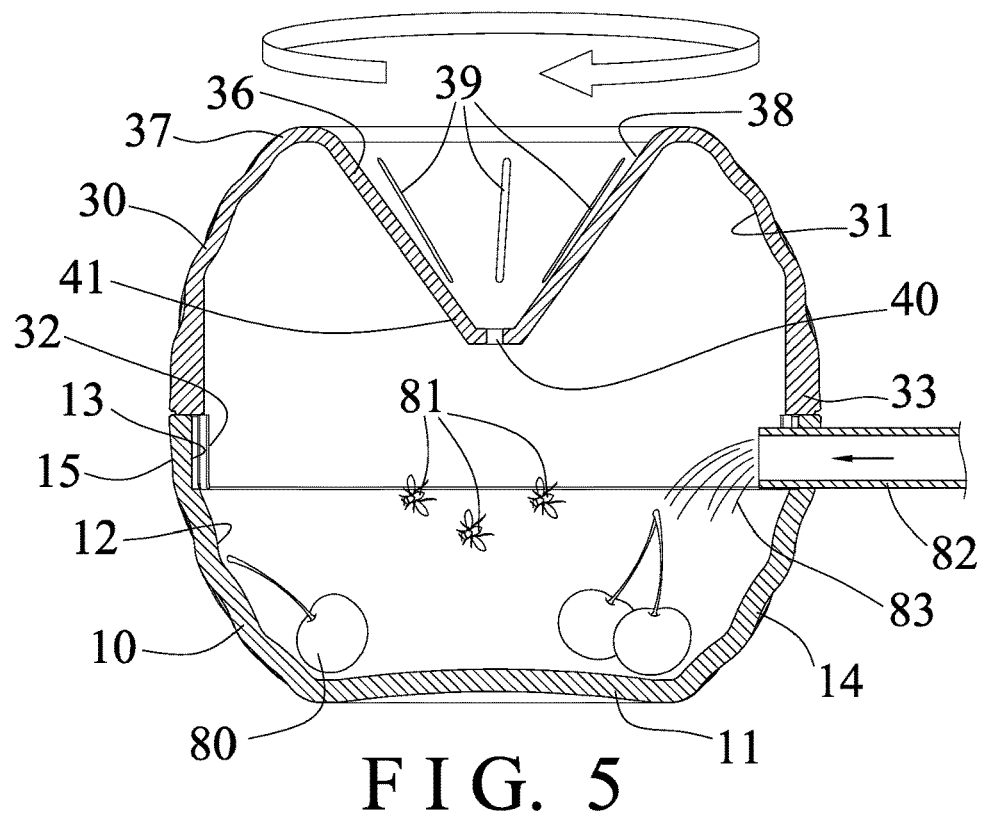
Figure 6:
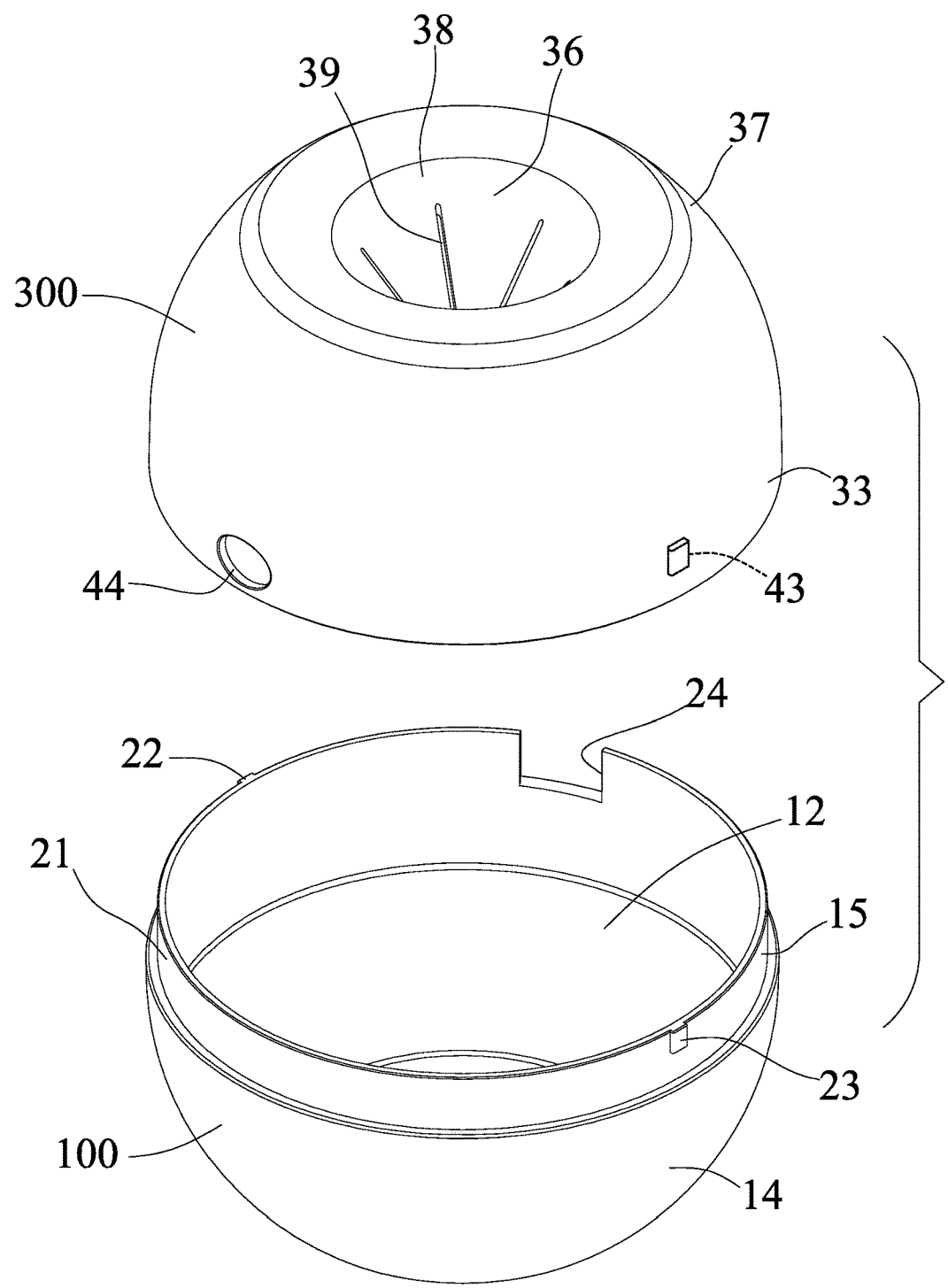
FIG. 6 is another exploded view similar to FIG. 1, illustrating the other arrangement of the fly catcher.
Figure 7:
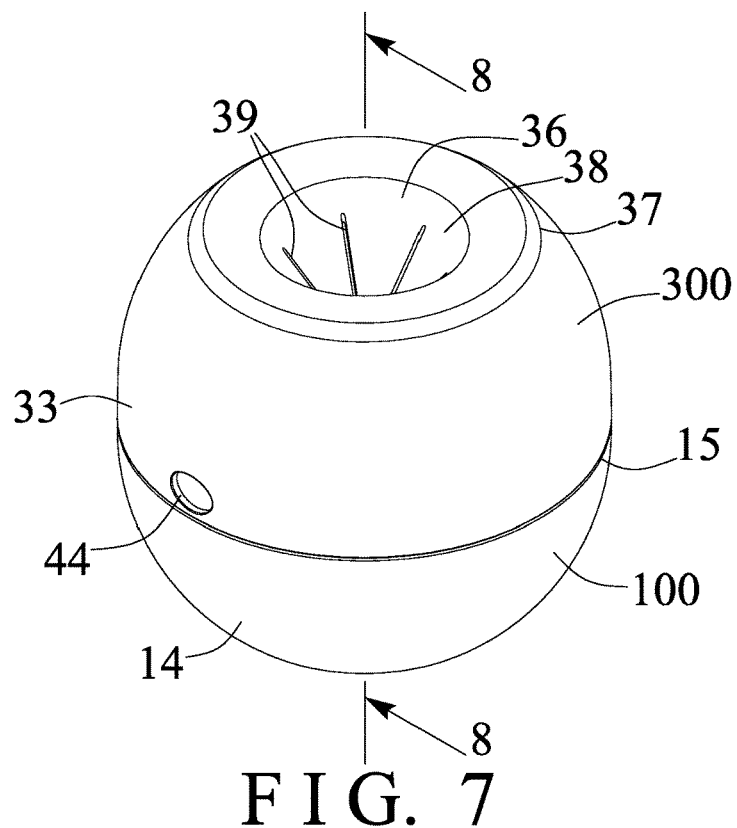
FIG. 7 is a perspective view of the fly catcher as shown in FIG. 6.
Figure 8:
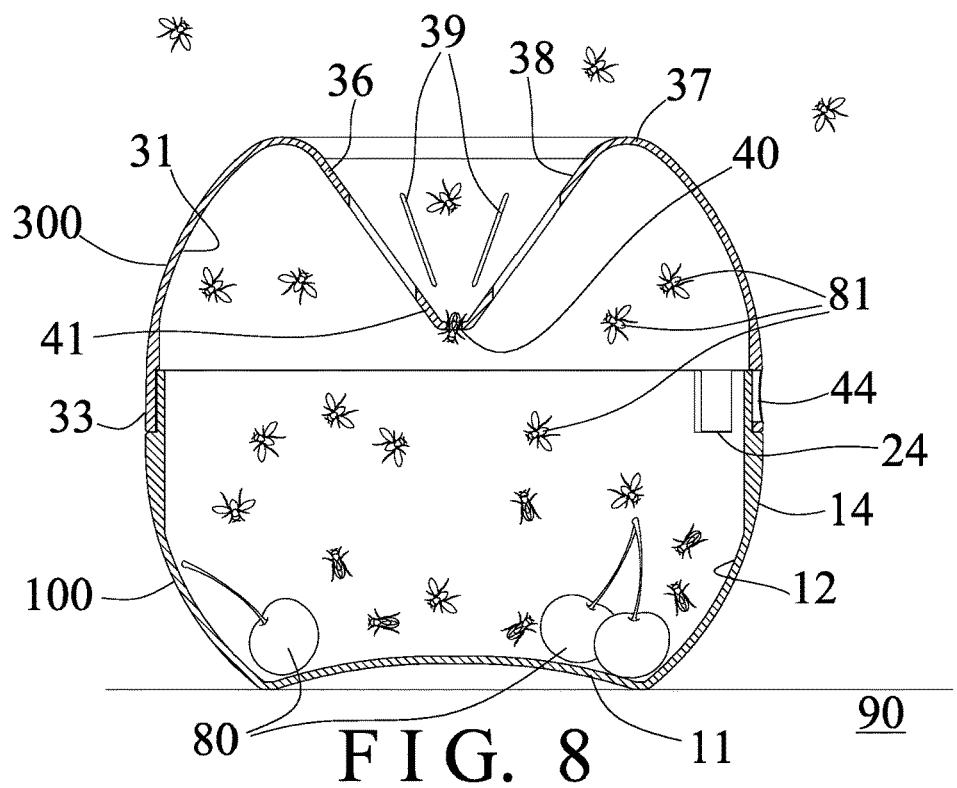
FIG. 8 is a cross sectional view of the fly catcher, taken along lines 8-8 of FIG. 7.
Figure 9:
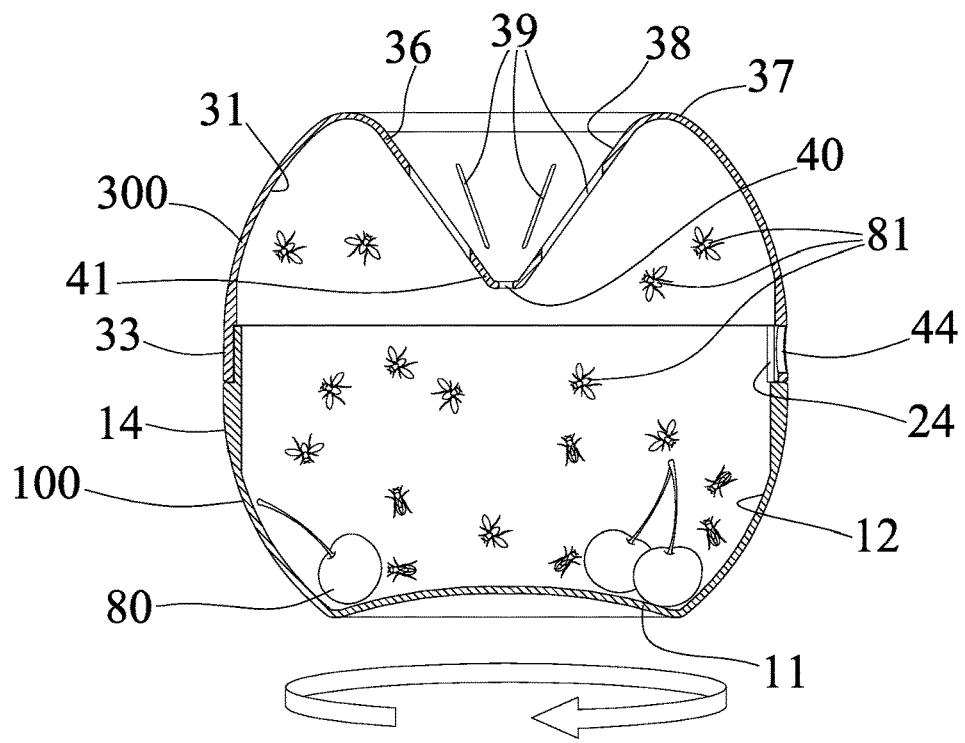
FIGS. 9, 10 are cross sectional views similar to FIG. 8, illustrating the operation of the fly catcher as shown in FIGS. 6-8.
Figure 10:
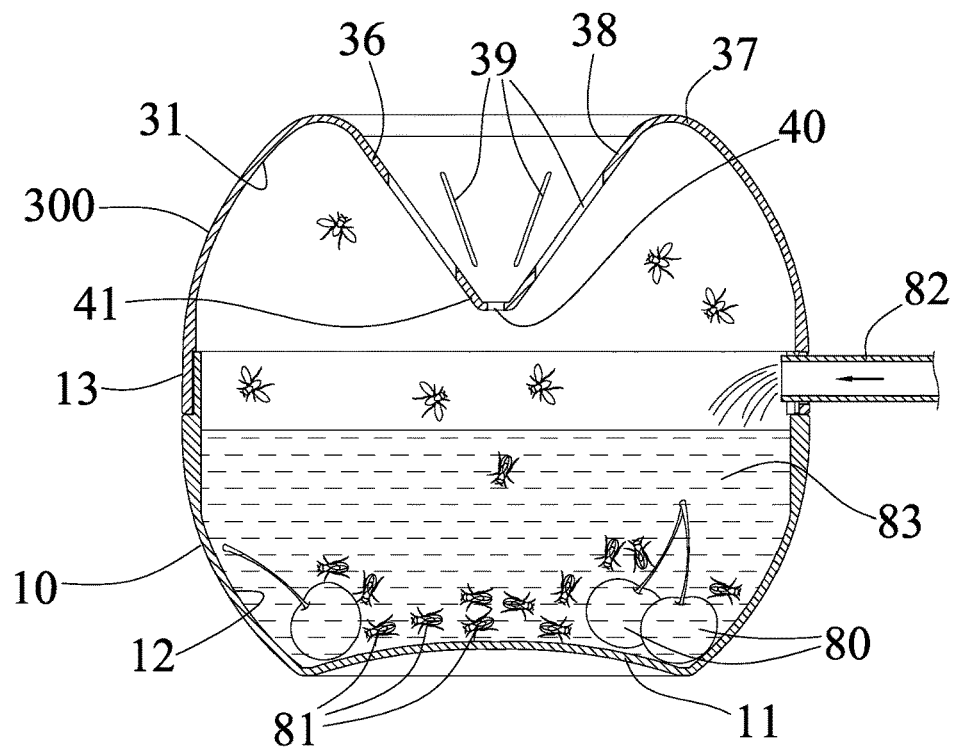

In operation, as shown in FIG. 3, when the opening 35 of the cover 30 is offset or spaced or disengaged or separated from the orifice 19 of the housing 10, when some attracting materials 80, such as fruit or meat or fish or the like, are disposed or engaged into the chamber 12 of the housing 10, the flies and/or the mosquitos 81 may be attracted and may fly through the slots 39 and/or the apertures 40 of the casing 36 and into the compartment 31 of the cover 30, and may be prevented from flying out of the casing 36 and of the cover 30. As shown in FIG. 4, the cover 30 may be selectively pivoted or rotated relative to the housing 10 in order to selectively align the opening 35 of the cover 30 with the orifice 19 of the housing 10, and a hose 82 (FIG. 5) may be selectively engaged through the opening 35 of the cover 30 with the orifice 19 of the housing 10 and into the compartment 31 of the cover 30 for introducing water or fluid 83 or the like into the chamber 12 of the housing 10.

Alternatively, as shown in FIGS. 6-10, the housing 100 includes a peripheral shoulder or recess 21 formed or provided in the upper peripheral portion 15 of the peripheral wall 14 or of the housing 100 (FIG. 6), instead of in the inner portion, for slidably or pivotally or rotatably engaging with the lower peripheral portion 33 of the cover 300, the housing 100 includes one or more (such as two) keys or projections 22, 23 extended radially and outwardly from the upper peripheral portion 15 of the peripheral wall 14 or of the housing 100, and includes a square or rectangular opening or notch 24 formed in the upper peripheral portion 15 of the peripheral wall 14 or of the housing 100 for selectively aligning with the circular opening 44 of the cover 300, and the cover 300 may include a projection or stop or key 43 extended radially and inwardly from the lower peripheral portion 33 of the cover 300 for selectively engaging with either of the projections 22, 23 of the housing 100 and for guiding and limiting the cover 300 to pivot or rotate relative to the housing 100.

Accordingly, the fly catcher in accordance with the present invention includes an improved and simplified structure or configuration that may be easily and quickly made or manufactured by the workers with a simplified making or manufacturing procedure and with a decreased manufacturing cost.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A fly catcher consisting of:
   a one-piece upwardly opening housing having (a) a bottom wall configured to rest on a flat surface; and (b) an outer sidewall extending spherically upward and outward from the bottom wall to an upper end; and
   a one-piece downwardly opening cover having (a) a top edge; (b) an outer sidewall extending spherically downward and outward from the top edge to a lower end; and (c) an inner sidewall extending conically downward and inward from the top edge to a pointed end, wherein the lower end of the cover is selectively nested concentrically inside the upper end of the housing to define a chamber between the housing and the cover, and the pointed end defines a fly admitting aperture into the chamber.

2. The fly catcher of claim 1, wherein the bottom wall defines a bottom edge that contacts the flat surface, and when the bottom edge of the housing rests on the flat surface, the bottom edge of the housing is spaced a distance beneath the upper end of the housing, and when the lower end of the cover is selectively nested concentrically inside the upper end of the housing to define the chamber, the top edge of the cover is spaced said distance above the upper end of the housing.

3. The fly catcher of claim 1, wherein the inner sidewall defines slits that open into the chamber.

4. The fly catcher of claim 3, wherein each of the slits has a length and a width, and the aperture has a diameter that is less than the length and greater than the width.

5. The fly catcher of claim 1, wherein the outer sidewall of the cover defines an outwardly facing circumferential first step proximate the lower end, and the outer sidewall of the housing defines an inwardly facing circumferential second step proximate the upper end, and when the lower end of the cover is selectively nested concentrically inside the upper end of the housing to define the chamber, the first step and the second step limit travel of the cover and the housing toward one another.

6. A fly catcher, consisting of:
   an upwardly opening housing having (a) a bottom wall configured to rest on a flat surface; and (b) an outer sidewall extending spherically upward and outward from the bottom wall to an upper end; and
   a downwardly opening cover having (a) a top edge; (b) an outer sidewall extending spherically downward and outward from the top edge to a lower end; and (c) an inner sidewall extending conically downward and inward from the top edge to a pointed end, wherein the lower end of the cover is selectively nested concentrically inside the upper end of the housing to define a chamber between the housing and the cover, and the pointed end defines a fly admitting aperture into the chamber;
   wherein an opening extends through the outer sidewall of the cover, and an orifice extends through the outer sidewall of the housing, and the cover is selectively rotatable relative to the housing in three orientations, the three orientations comprising:
   (a) a first orientation, wherein the opening aligns with the orifice to provide a passage into the chamber and the cover is engaged with the housing,
   (b) a second orientation, wherein the outer sidewall of the cover spans the orifice, the outer sidewall of the housing spans the opening, and the cover is engaged with the housing, and
   (c) a third orientation, wherein the outer sidewall of the cover spans the orifice, the outer sidewall of the housing spans the opening, and the cover is disengaged with the housing thereby allowing the cover to be separated from the housing.

7. The fly catcher of claim 6, wherein first and second diametrically opposed keys project outward from the outer sidewall of the cover, and first and second diametrically opposed keyways project into the outer sidewall of the housing, and the cover is selectively rotatable relative to the housing, wherein the keys occupy the keyways to resiliently lock the cover in place relative to the housing in the first and second orientations.

8. A cover for a fly catcher, the cover consisting of a one-piece shell having (a) a top edge; (b) an outer sidewall extending spherically downward and outward from the top edge to a lower end; and (c) an inner sidewall extending conically downward and inward from the top edge to a pointed end, wherein the pointed end defines an aperture sized and configured to accommodate passage of a fly.

9. The cover of claim 8, wherein slits extend through the inner sidewall.

10. The fly catcher of claim 9, wherein each of the slits has a length and a width, and the aperture has a diameter that is less than the length and greater than the width.

11. A method of using a fly catching receptacle to catch fruit flies, comprising the steps of:
   (a) providing a fly catching receptacle having a lower housing and an upper cover that are selectively interconnected to define an internal space and at least one route from outside the internal space to inside the internal space, wherein the lower housing defines a bottom portion of the internal space, and the upper cover defines a top portion of the internal space, and an opening in the lower housing selectively aligns with an orifice in the upper cover to provide relatively greater access to the internal space;
   (b) placing material that attracts fruit flies in the bottom portion of the internal space to encourage fruit flies to pass through said at least one route from outside the internal space to inside the internal space;
   (c) positioning the upper cover and the lower housing so that the orifice does not align with the opening;
   (d) after capturing fruit flies inside the internal space, aligning the opening with the orifice and introducing water into the internal space through the aligned opening and orifice to drown fruit flies inside the internal space.

12. The method of claim 11, wherein step (b) is performed with the upper cover removed from the lower housing, and further comprising the step of connecting the upper cover to the lower housing after performing step (b).

13. The method of claim 12, further comprising the step of ensuring that the opening and the orifice are out of alignment relative to one another after performing the step of connecting the upper cover to the lower housing.

14. The method of claim 13, wherein step (c) is performed by rotating the upper cover relative to the lower housing until the opening aligns with the orifice.

15. The method of claim 11, wherein step (c) is performed by rotating the upper cover relative to the lower housing until the opening aligns with the orifice.

16. The method of claim 11, wherein after step (b), further comprising the step of ensuring that the opening and the orifice are out of alignment relative to one another.

* * * * *